United States Patent
Agarwal et al.

(10) Patent No.: US 12,199,746 B2
(45) Date of Patent: Jan. 14, 2025

(54) MECHANISM FOR PRECISE TIME SYNCHRONIZATION IN A DATACENTER NETWORK

(71) Applicant: Google LLC, Mountain View, CA (US)

(72) Inventors: Abhishek Agarwal, Santa Clara, CA (US); Ye Tang, Palo Alto, CA (US); Prashant R. Chandra, San Jose, CA (US); Simon Luigi Sabato, Saratoga, CA (US); Hema Hariharan, Cupertino, CA (US)

(73) Assignee: Google LLC, Mountain View, CA (US)

( * ) Notice: Subject to any disclaimer, the term of this patent is extended or adjusted under 35 U.S.C. 154(b) by 199 days.

(21) Appl. No.: 17/969,095

(22) Filed: Oct. 19, 2022

(65) Prior Publication Data

US 2024/0137140 A1 Apr. 25, 2024
US 2024/0235710 A9 Jul. 11, 2024

(51) Int. Cl.
*H04J 3/06* (2006.01)

(52) U.S. Cl.
CPC .................. *H04J 3/0667* (2013.01)

(58) Field of Classification Search
CPC .................. H04L 5/14; H04J 3/0667
See application file for complete search history.

(56) References Cited

U.S. PATENT DOCUMENTS

| | | | |
|---|---|---|---|
| 8,370,676 B2 * | 2/2013 | Matsunaga | H04J 3/0685 713/400 |
| 8,473,638 B2 | 6/2013 | Aweya et al. | |
| 8,824,332 B2 * | 9/2014 | Gao | H04J 3/0688 370/401 |
| 8,938,636 B1 | 1/2015 | Hochschild et al. | |
| 9,569,253 B1 | 2/2017 | Hsieh et al. | |
| 9,722,739 B2 | 8/2017 | Chapman et al. | |
| 9,866,339 B1 | 1/2018 | Mizrahi | |
| 9,882,666 B2 | 1/2018 | Hsueh et al. | |
| 10,237,008 B2 | 3/2019 | Butterworth et al. | |
| 10,976,769 B2 | 4/2021 | Carlson et al. | |
| 11,153,670 B1 * | 10/2021 | Winzer | H04J 3/0667 |
| 11,271,838 B2 | 3/2022 | Crabtree et al. | |
| 11,968,107 B2 * | 4/2024 | Abdelhameed | H04J 3/0655 |
| 2010/0158164 A1 * | 6/2010 | Oh | H04L 27/2656 375/343 |
| 2014/0355158 A1 * | 12/2014 | Metzner | H04L 25/0282 361/63 |
| 2016/0330707 A1 | 11/2016 | Das et al. | |
| 2018/0066597 A1 * | 3/2018 | Fukuzumi | F02D 41/20 |

(Continued)

OTHER PUBLICATIONS

Extended European Search Report for European Patent Application No. 23173365.0 dated Mar. 6, 2024. 6 pages.

(Continued)

*Primary Examiner* — Bailor C Hsu
(74) *Attorney, Agent, or Firm* — Lerner David LLP (57) ABSTRACT

Aspects of the disclosure are directed to supporting time synchronization across a datacenter network with greater accuracy. The time synchronization includes both software based and hardware based time synchronization mechanisms to provide more precise time synchronization across various nodes in the datacenter network. The software based mechanism can provide the initial coarse time synchronization while the hardware based mechanism can provide the subsequent finer time synchronization.

20 Claims, 6 Drawing Sheets

(56) References Cited

U.S. PATENT DOCUMENTS

| | | | |
|---|---|---|---|
| 2019/0018145 A1* | 1/2019 | Roovers | G01S 19/256 |
| 2020/0285265 A1* | 9/2020 | Ranganathan | G06F 1/12 |
| 2021/0141413 A1 | 5/2021 | Levi et al. | |
| 2021/0185139 A1 | 6/2021 | Wang et al. | |
| 2022/0345525 A1* | 10/2022 | Rizzo Piazza Roncoroni | H04L 12/4035 |
| 2024/0168797 A1* | 5/2024 | Wasko | G06F 1/12 |

OTHER PUBLICATIONS

Kyriakakis, E., et al., "Hardware Assisted Clock Synchronization with the IEEE 1588-2008 Precision Time Protocol", Real-Time Networks and Systems, ACM, Oct. 2018, pp. 51-60.

Shrivastav, V., et al., "Globally Synchronized Time via Datacenter Networks", IEEE/ACM Transactions on Networking, vol. 27, No. 4, Aug. 2019. 16 pages.

IEEE Standard for a Precision Clock Synchronization Protocol for Networked Measurement and Control Systems. Jul. 24, 2008. IEEE Std 1588-2008 (Revision of IEEE Std 1588-2002). Technical Committee on Sensor Technology (TC-9), IEEE Instrumentation and Measurement Society, 289 pages.

\* cited by examiner

MECHANISM FOR PRECISE TIME SYNCHRONIZATION IN A DATACENTER NETWORK

BACKGROUND

A time synchronization protocol can involve building a tree of nodes, typically with the highest precision clock at the root of the tree. A master node can send a sync message at a first time T1. A local node can receive the sync message at a second time T1'. The local node can send a delay request at a third time T2'. The master node can receive the delay request at a fourth time T2. Assuming delay is a one-way delay between nodes and offset is a current offset between a master and a local clock, then T1'−T1=delay+offset and T2−T2'=delay−offset. With the four timestamps T1, T1', T2, and T2', the local node can solve for the delay and offset and adjust its local clock using the offset.

A device that shares a single clock, such as a network router, typically has a single local time domain and runs the time synchronization protocol at all ports of the device. One port can be configured to synchronize an internal domain to an external master while the remaining ports can operate as masters for downstream devices/domains. A firmware controlled digital phase-locked loop (DPLL) can maintain time for the device, speeding or slowing in response to sync messages that arrive periodically, typically about every second. One instance of the DPLL can run for each clock domain.

For time synchronization to perform well, delay is assumed to be symmetric in both directions and delay variation, such as jitter, should be minimized. To accomplish this, queuing of any sort is avoided between taking a transmit timestamp, such as the first time T1, and taking a receive timestamp, such as the second time T1'. The timestamps are captured close to the point of transmission/reception, such as being performed in the physical layer.

Software overheads in the time synchronization protocol can result in significant increases in latency, thus reducing accuracy of the time synchronization.

BRIEF SUMMARY

Aspects of the disclosure are directed to supporting time synchronization across a datacenter network with greater accuracy. The time synchronization includes both software based and hardware based time synchronization mechanisms to provide more precise time synchronization across various nodes in the datacenter network. The software based mechanism can provide an initial coarser time synchronization while the hardware based mechanism can provide subsequent finer time synchronization.

An aspect of the disclosure provides for a method for synchronizing time between a master hardware clock and one or more client hardware clocks. The method includes: receiving, by one or more processors of a client hardware clock, a time sync message; performing, by the one or more processors, a validity check on the time sync message; updating, by the one or more processors, a time of the client hardware clock in response to the received time sync message passing the validity check; incrementing, by the one or more processors, a valid update count in response to the received time sync message passing the validity check; and locking, by the one or more processors, the time of the client hardware clock in response to the valid update count incrementing above a threshold.

In an example, the time sync message is transmitted from one or more processors of one of a master hardware clock or an upstream client hardware clock. In another example, the method further includes transmitting, with the one or more processors, the time sync message to a downstream client hardware clock. In yet another example, updating the time of the client hardware clock further includes at least one of: adjusting the time a number of steps forward or backward; or adjusting a frequency of the client hardware clock. In yet another example, locking the client hardware clock further includes determining the client hardware clock is within a threshold range from the master hardware clock.

In yet another example, the method further includes transmitting, by the one or more processors, a latency request message; receiving, by the one or more processors, a latency response message; and determining, by the one or more processors, a hardware latency time based on a time difference from when the latency request message was transmitted to the latency response message being received. In yet another example, updating the time of the client hardware clock further includes removing the hardware latency time from the time of the client hardware clock. In yet another example, the hardware latency time is fixed.

In yet another example, performing the validity check further includes determining a time in the time sync message is within a threshold. In yet another example, the method further includes skipping, by the one or more processors, an update of the time of client hardware clock in response to the received time sync message not passing the validity check. In yet another example, the method further includes incrementing, by the one or more processors, a skip update count in response to the received time sync message not passing the validity check. In yet another example, the method further includes resetting, by the one or more processors, the client hardware clock in response to the skip update count incrementing above a threshold.

Another aspect of the disclosure provides for a system including one or more processors; and one or more storage devices coupled to the one or more processors and storing instructions that, when executed by the one or more processors, cause the one or more processors to perform operations for synchronizing time between a master hardware clock and one or more client hardware clocks. The operations include: receiving a time sync message; performing a validity check on the time sync message; updating a time of a client hardware clock in response to the received time sync message passing the validity check; incrementing a valid update count in response to the received time sync message passing the validity check; and locking the time of the client hardware clock in response to the valid update count incrementing above a threshold.

In an example, updating the time of the client hardware clock further includes at least one of: adjusting the time a number of steps forward or backward; or adjusting a frequency of the client hardware clock. In another example, locking the client hardware clock further includes determining the client hardware clock is within a threshold range from the master hardware clock.

In yet another example, the operations further include transmitting a latency request message; receiving a latency response message; and determining a hardware latency time based on a time difference from when the latency request message was transmitted to the latency response message being received; where updating the time of the client hardware clock further includes removing the hardware latency time from the time of the client hardware clock.

In yet another example, the operations further include skipping an update of the time of client hardware clock in response to the received time sync message not passing the validity check; incrementing a skip update count in response to the received time sync message not passing the validity check; and resetting the client hardware clock in response to the skip update count incrementing above a threshold.

Yet another aspect of the disclosure provides for a non-transitory computer readable medium for storing instructions that, when executed by one or more processors, cause the one or more processors to perform operations for synchronizing time between a master hardware clock and one or more client hardware clocks. The operations include: receiving a time sync message; performing a validity check on the time sync message; updating a time of a client hardware clock in response to the received time sync message passing the validity check; incrementing a valid update count in response to the received time sync message passing the validity check; and locking the time of the client hardware clock in response to the valid update count incrementing above a threshold.

In an example, the operations further include: transmitting a latency request message; receiving a latency response message; and determining a hardware latency time based on a time difference from when the latency request message was transmitted to the latency response message being received; where updating the time of the client hardware clock further includes removing the hardware latency time from the time of the client hardware clock.

In another example, the operations further include: skipping an update of the time of client hardware clock in response to the received time sync message not passing the validity check; incrementing a skip update count in response to the received time sync message not passing the validity check; and resetting the client hardware clock in response to the skip update count incrementing above a threshold.

DETAILED DESCRIPTION

Generally disclosed herein are implementations for supporting precise time synchronization across a datacenter network. The time synchronization includes both a software based time synchronization mechanism and a hardware based time synchronization mechanism to provide more accurate time synchronization across various nodes in the datacenter network. The initial coarse time synchronization across the datacenter network can be performed by software while finer and more accurate time synchronization can be performed by hardware circuitry.

Each network interface controller (NIC) includes a hardware clock to be used within the NIC and its corresponding host as a global time. Each hardware clock can be set by writing a current time control status register (CSR) with a new value, writing a time adjust CSR with a desired step forward or backward, in cycles, or receiving a valid time sync message which requires a step forward or backward, in cycles. The time adjust or time sync clock adjustment can be performed by running the hardware clock slower or faster for as many cycles as needed by the step size. The hardware clock speed adjustment can be performed by adjusting a frequency that is incremented or decremented by itself right shifted by a configurable value. The configurable value can be set aggressively at startup and slowed down to smooth responses when a lock is acquired.

Each hardware clock includes a fine frequency adjustment, which can be implemented via a least significant bit for fractional clock counting. The clock frequency can be set faster or slower by changing the configurable value. The average of the previous number of time sync differences can be continually computed. This can enable NICs to use the fine frequency adjustment to attempt to match the frequency of the master NIC, minimizing differences seen with each time sync message.

Each hardware clock can maintain status bits that indicate a quality of the local current time, corresponding to several parameters to indicate an accuracy of each hardware clock. The time quality parameters can include a time locked parameter, a skip update parameter, and a software bits parameter. The time locked parameter can determine whether the time of the hardware clock is considered locked, which corresponds to being within a threshold range from a master clock. The skip update parameter can correspond to a number of skipped time sync messages reflected in the current time. The software bits parameter can be opaque to the hardware, such that software could use these bits to pass additional information between nodes without involving the hardware.

Current time is distributed from master hardware clocks to client hardware clocks (and from there to second-hop client hardware clocks, etc.) via the time sync messages. The time ordered set can include a subtype, time locked parameter, skip update parameter, software bits parameter, the time, and an error check.

Each NIC can be a master, client, or free running A master NIC can only transmit time sync messages. The master NIC can include software-based time synchronization to synchronize the clock using time adjust and fine frequency adjustments. A client NIC that can receive time sync messages from an upstream NIC (that can be a master or other client NIC closer to the master) or transmit time sync messages to a downstream NIC. The client NIC can include software-based time synchronization for initial setup of the rough time. A free running NIC is independent of master and client NICs. A free running NIC can include software-based time synchronization to synchronize the clock using time adjust and fine frequency adjustments.

Each NIC can transmit time sync messages on any number of output links. The time sync messages are transmitted at a configured interval that can be set by a time update timer register. On client hardware clocks, an incoming time sync message can cause an update to be sent downstream. The time sync message can indicate the actual time of transmission +/−delays. The delays are accounted for by incrementing the time field in the time sync message for each cycle that the time sync message waits to be transmitted.

Each NIC can receive time sync messages via a CSR that can control which port, if any, will honor the time sync messages. When an enabled port receives the time sync message, the time in the time sync message can be adjusted for any on-chip delays to get the time sync message to the hardware clock. Delays can include time to egress the far side NIC, the time across the channel, the time to ingress the local NIC, and flight time across the NIC to the hardware clock.

To consider variable length cables, channels, etc., each NIC includes a link latency measurement capability. The NIC can send a latency request message to a switch. The latency request can be generated on a chip reset or when a time lock is lost. The switch latches the latency request message and generates a latency response back to the NIC. Just as with time sync messages, the time field of the latency message is incremented every cycle the latency response waits to be transmitted. The NIC can receive the latency response and subtract the received time field from the current time.

Each NIC can be initialized with actual global time. The initial global time can be written to all NICs and then transmission and reception of time sync messages can be enabled. The time bound register can be set for an acceptable threshold so the different NICs can lock on to the master. Once all NICs have been locked, the time bound register can be made tighter.

For validity checks, to be accepted at a received NIC, the time sync message can be received on a port enabled for time sync reception, have a valid error check, indicate a time with lock threshold cycles of the local time, and have an incoming time that is locked. The hardware clock can internally maintain two CSR readable counts: a skipped updates count and a valid updates count. Any message that does not pass the validity checks involving time locks can lead to an increment of the skipped update count and a reset of the valid updates count. When the number of skipped updates increases beyond a time bound skipped messages threshold, the master time could have changed, leading to clearing the time lock parameter and interrupting the NIC. When a valid update is received, the hardware clock can move towards the received time and the valid updates count is incremented. The skipped update count can be reset to the incoming skipped update value. When the number of valid updates increases beyond a time bound locked messages threshold, the hardware clock can lock. The time lock parameter is updated based on internal skipped updates and valid update counts while the time itself is updated based on validity of incoming time sync messages.

Figure 1:
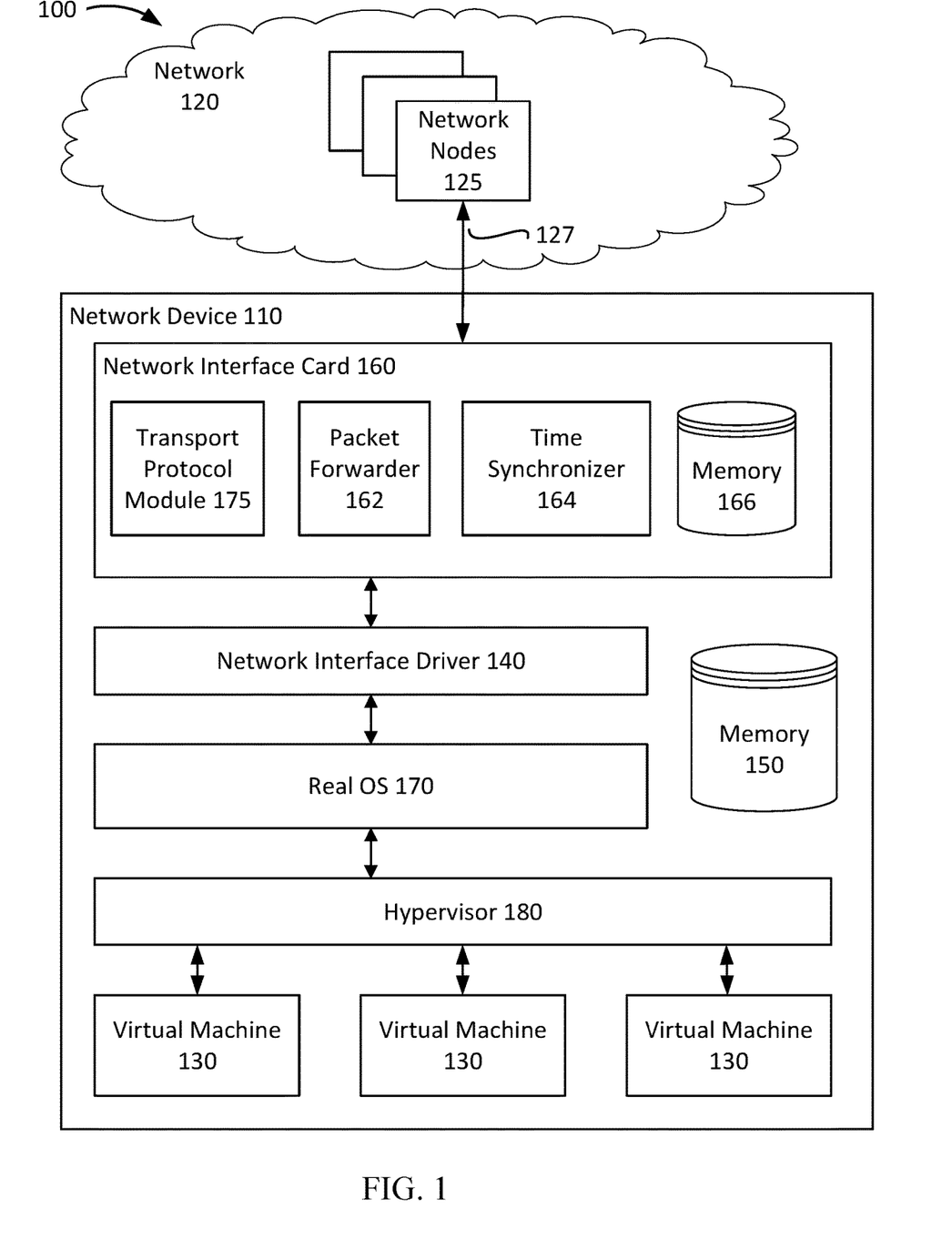
FIG. 1 depicts a block diagram of an example network environment with a network device according to aspects of the disclosure.

FIG. 1 depicts a block diagram of an example network environment 100 with a network device 110. The network environment 100 includes a network 120 of interconnected network nodes 125. The network nodes 125 participate in the network 120 as data sources, data destinations or data sinks, and/or intermediary nodes such as switches, routers, and/or gateways propagating data from sources towards destinations through the network 120. The network 120 includes the network device 110 with links 127 to various other participating network nodes 125.

The network 120 can facilitate interactions between participant devices. Example networks include the Internet, a local network, a network fabric, or any other local area or wide area network. The network 120 can be composed of multiple connected sub-networks or autonomous networks. The network 120 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. The network can be public, private, or a combination of public and private. In general, the network 120 can be used to convey information between computing devices; for example, network nodes 125, and the network device 110.

The network device 110 can be a host device or server executing one or more virtual machines 130 on one or more processors of the network device 110. The network device 110 can include a network interface driver 140, a memory 150, a network interface card 160, a real operating system (OS) 170, a hypervisor 180, and the virtual machines 130. The network device 110 can communicate with other network devices over the network 120. The network device 110 and other network devices can create or participate in one or more virtual networks to facilitate communication between virtual machines 130. The one or more virtual networks can overlay the physical network that makes up the network 120. Data packets can be routed within one of the virtual networks overlaying the physical network using a system of data packet encapsulation. The network device 110 and the network nodes 125 can route the data packets according to virtual Internet protocol addresses (VIPs) and MAC addresses. In some examples, the network device 110 can host one or more virtual machines 130 that transmit data packets or receive data packets. In other examples, the network device 110 can be an intermediate node of a path between two virtual machines executing on two separate network devices. Accordingly, the network device 110 can act as a source, destination, or intermediate switch in one or more virtual networks.

The hypervisor 180 can manage operation of the virtual machines 130, including spinning up and terminating the virtual machines 130, managing allocation of memory 150 to the virtual machines 130, and live migrating the virtual machines 130 to other network devices.

The memory 150 can store data and/or computer executable instructions related to the operation and use of the network interface driver 140. The memory 150 can include a high bandwidth memory (HBM), a dynamic random access memory (DRAM), a synchronous dynamic random access memory (SDRAM), a static random access memory (SRAM), and/or a flash memory, as examples. The memory 150 can store computer executable instructions of a transport protocol module 175, such as a transmission control protocol (TCP) module or the TCP layer of a network stack, to be executed on a processor of the network device 110. While shown in the network interface card 160, the transport protocol module 175 can also be included in the real OS. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 140 can include a network interface driver software module running on the real OS 170. As an example, the network interface driver 140 can be a collection of computer executable instructions stored in the memory 150 that when executed by a processor help facilitate network communications. As another example, the network interface driver 140 can be implemented as logic in a hardware processor or other integrated circuit, or as a combination of hardware and software logic. The network interface driver 140 can communicate with one of the software virtual machines 130 directly or via a guest OS of the virtual machine 130 and/or the hypervisor 180.

The network interface driver 140 can be included within a layer of a network stack of the real OS 170 of the network device 110. In an example, the network interface driver 140 can be included within a data link layer of a network stack and can communicate with a software module or application that is included in an application layer of the network stack. In another example, the network interface driver 140 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a UDP module, RDP module, RUDP module, or a DCCP module. While not shown, the network interface driver 140 can be included as a portion of the network interface card 160.

The network interface card 160 can be configured to transfer data packets over a network protocol, such as a layer 2 protocol. The network interface card 160 can include a packet forwarder 162, a time synchronizer 164, and a memory 166.

The memory 166 can store data and/or computer executable instructions related to the operation and use of the network interface card 160. For example, the memory 166 can store time sync messages as well as instructions related to validity checks. The memory 166 can include a SRAM, HBM, DRAM, SDRAM, and/or a flash memory, as examples.

The packet forwarder 162 can be implemented in an application-specific integrated circuit (ASIC) or as software executing on a microprocessor. The packet forwarder 162 can receive data packets for transmission from the virtual machines 130 and route them to one or more destination virtual machines executing on remote network devices. The packet forwarder 162 can also perform functions that allow the network interface card 160 to act as a destination for data packets received over the links 127. For example, the packet forwarder 162 can receive a data packet over one of the lines 127, decapsulate the data packet, and forward the data packet to one or more destination virtual machines 130 executing on the network device 110. The packet forwarder 162 can transmit and receive data packets based on the connection entries stored in the cache 166. Each transmission or reception of a data packet can correspond to deallocation or allocation of the memory 150, respectively.

The time synchronizer 164 can be implemented in an application-specific integrated circuit (ASIC) or as a combination of hardware and software executing on a microprocessor. The time synchronizer 164 can support precise time synchronization via both a software based time synchronization mechanism and a hardware based time synchronization mechanism. Initial coarse time synchronization can be performed by software while subsequent finer time synchronization can be performed by hardware.

Figure 2:
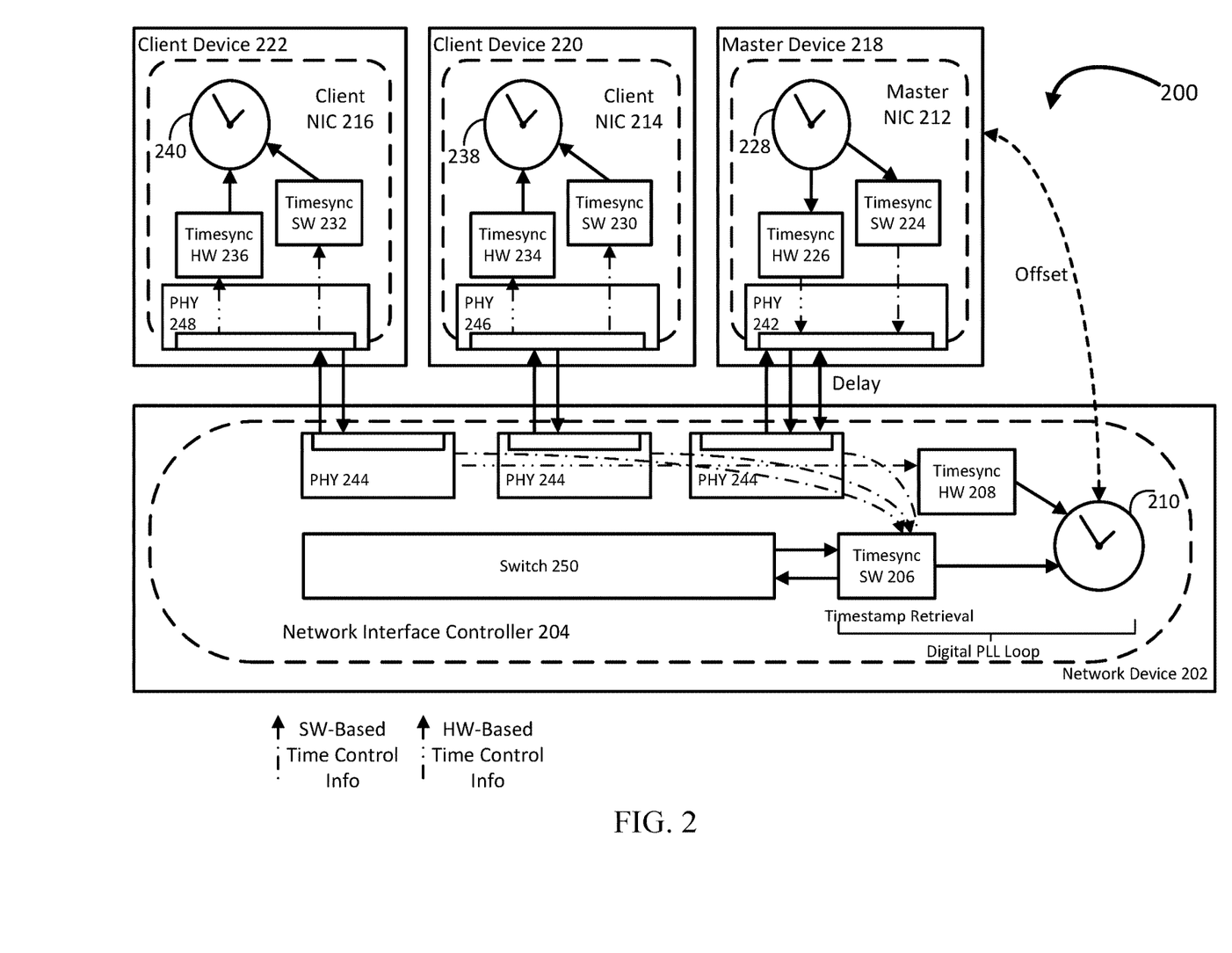
FIG. 2 depicts a block diagram of example time synchronization of a network device according to aspects of the disclosure.

FIG. 2 depicts a block diagram of example time synchronization 200 of a network device 202. The network device 202 can correspond to the network device 110 as depicted in FIG. 1. The network device 202 includes a network interface controller (NIC) 204 that can include time sync software 206, time sync hardware 208, and a hardware clock 210. The time sync software 206, time sync hardware 208, and hardware clock 210 can correspond to the time synchronizer 164 as depicted in FIG. 1. The time synchronization 200 utilizing both time sync software 206 and time sync hardware 208 can allow for more accurate time synchronization, leading to more efficient database replicas and saving computing resources to maintain the database replicas.

The time sync software 206 can include one or more processors in communication with memory. The processors can be any logic circuitry that executes instructions fetched from the memory, including one or more central processing units (CPUs) and/or graphic processing units (GPUs). The time sync hardware 208 can be implemented as hardware logic circuitry, such as a combination of logic gates, registers, and/or flops, using field programmable gate arrays and/or application specific integrated circuits (ASICs), such as tensor processing units (TPUs).

The hardware clock 210 can be used within the NIC 204 and its corresponding network device 202 as a global time. The hardware clock 210 can count in units of core clock cycles, such as 900 MHz, 1.111 ns per cycle. The hardware clock 210 can correspond to a 62-bit clock that rolls over in about 180 years.

The NIC 204 can set the hardware clock 210 by writing a current time control status register (CRS) with a new value, writing a time adjust CSR with a desired step forward or backward in cycles, or receiving a valid time sync message requiring a step forward or backward in cycles. The NIC 204 can perform the time adjust or time sync clock adjustment by running the hardware clock 210 slower or faster for as many cycles as needed based on step size. For example, to step backwards 50 cycles, the hardware clock 210 can be incremented by 0.5 steps (instead of 1.0 steps) for 100 cycles, resulting in a loss of 50 cycles.

The NIC 204 can perform speed adjustment of the hardware clock 210 by adjusting a frequency via the time sync software 206. To speed up, the frequency can be incremented by itself right shifted by a configurable value N. As an example, the configurable value N can range from 1 to 7. To slow down, the frequency can be decremented by itself right shifted by the configurable value N. This can result in the frequency being multiplied or divided by the configurable value N. At startup, the time sync software 206 can set the configurable value aggressively, such as setting N=1 to 2. Over time, the time sync software 206 can slow down the configurable value, such as setting N=2 to 7, to smooth responses when a lock is acquired.

Figure 3:
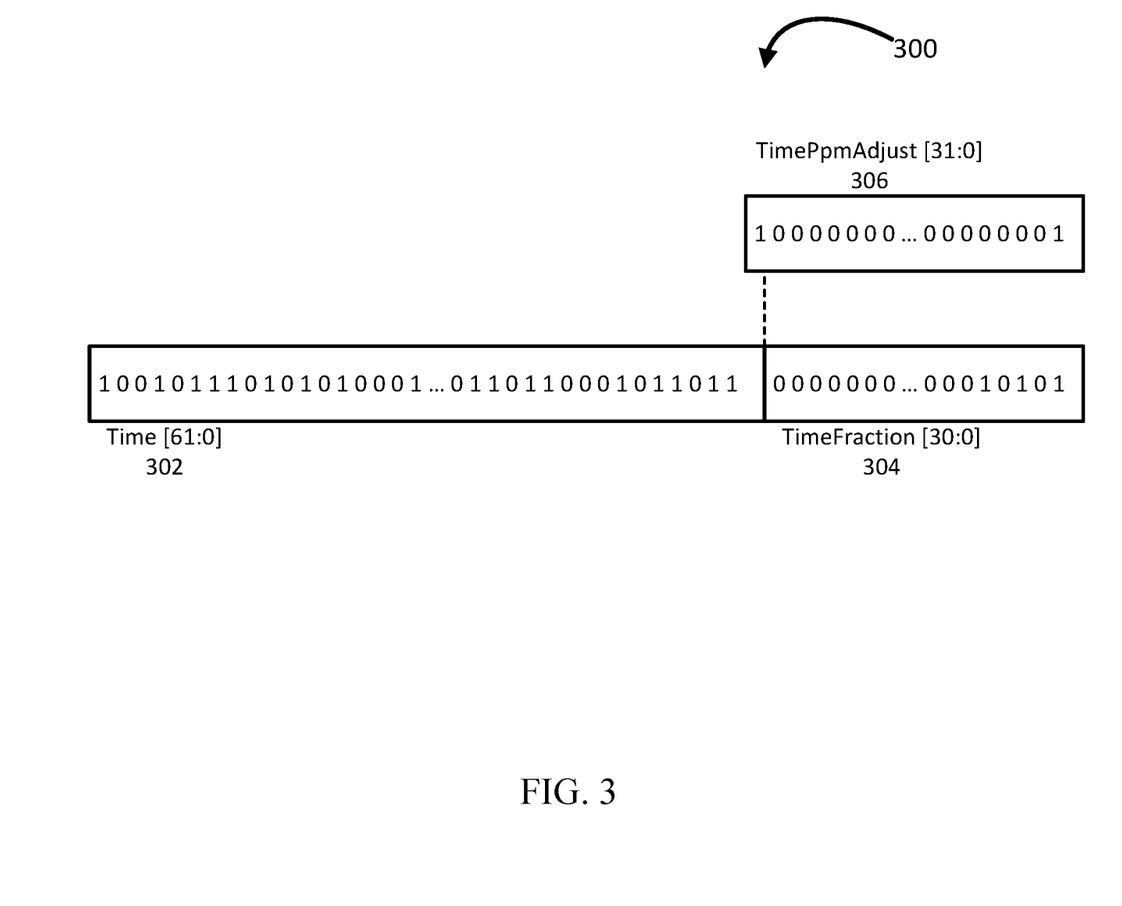
FIG. 3 depicts a block diagram of an example configuration for time adjustment according to aspects of the disclosure.

The hardware clock 210 can include a fine frequency adjustment performed via the time sync hardware 208. As an example, the fine frequency adjustment can have a resolution of 0.5 parts per billion. The fine frequency adjustment can be implemented via additional bits of least significant bits for fractional clock counting. FIG. 3 depicts a block diagram of an example configuration 300 for time adjustment. The configuration 300 includes a time register 302, a time fraction adjustment register 304, and a fine frequency adjustment register 306. As examples, the time register can include 62 bits, the time fraction adjustment register can include 31 bits, and the fine frequency adjustment register 306 can include 32 bits. It should be noted the bits shown in each register are exemplary and not intended to be limiting.

The fine frequency adjustment register 306 can indicate how much to increment the time register 302 on each cycle. The fine frequency adjustment register 306 can default to incrementing the time register 302 by 1 bit each cycle, such as being indicated by setting the fine frequency adjustment register 306 as 0x80000000. The frequency of the hardware clock 210 can be set faster or slower by changing the configurable value N. For example, to set the hardware clock frequency faster, the fine frequency adjustment register 306 can be set to (0x80000000+((N<<<31)/1,000,000,000))).

The time fraction adjustment register 304 can be used for high resolution time adjustment. For example, the time fraction adjustment register 304 can adjust time at 0.5 parts per billion.

An average of previous time sync differences between the NIC 204 and upstream NICs can be continually computed by the NIC 204. This can enable the NIC 204 to use the fine frequency adjustment via the time sync hardware 208 to attempt to match the frequency of a master NIC, minimizing differences seen with each time sync message. Averaging can essentially perform a low pass filter on the time sync differences. Because individual time sync messages can have varying differences due to, for instance, network effects, averaging can negate the impact of those network effects, which allows for achieving the master clock frequency sooner.

Referring back to FIG. 2, the time sync hardware 208 can maintain status bits that indicate a quality of the local current time. The quality can correspond to several time quality parameters indicative of an accuracy of the hardware clock 210. The time quality parameters can include a time locked parameter, a skip update parameter, and a software bits parameter.

The time locked parameter can determine whether the time of the hardware clock 210 is considered locked, which corresponds to being within a threshold range, such as +/−100 ns, from a master clock. The range for whether the time is considered locked can be configurable. At a master clock, the time locked parameter should always be locked, such as indicated by a '1' bit. At other hardware clocks, if the time is less than the lock threshold after a configurable number of time sync updates, such as 3, the time sync message can update with step counts less than the lock threshold. If the time is greater than the lock threshold after the configurable number of time sync updates, the time sync message can update with step counts greater than the lock threshold.

The skip update parameter can correspond to a number of skipped time sync messages reflected in the current time. At a master clock, the time sync messages should not be skipped, such as indicated by a '0' bit. As other hardware clocks, after a timeout waiting for a time sync message or if an incoming time sync message is not accepted, such as based on validity checks, the skip update parameter is incremented, such as being incremented by a '1' bit. The skip update parameter can be copied from incoming time sync messages. For example, a hardware clock two hops removed from a master clock may have missed an update, and an upstream hardware clock may have already had its skipped update incremented by 2, which would result in a local skipped update parameter equal to 3. This can also be sent in any outgoing time sync messages. The skip update parameter can saturate upon reaching its maximum value, such as a value of 7. Once the skip update parameter saturates, it is no longer incremented. The time sync hardware 208 can raise an interrupt to the NIC 204 once the skip update parameter saturates, so that the NIC 204 can take further action to identify why so many messages are being skipped.

The software bits parameter can be opaque to the time sync hardware 208, such the NIC 204 could use these bits to pass additional information between network devices without involving the time sync hardware 208 or hardware clock 210. At a master clock, the software bits parameter can be copied from a CSR into outgoing messages. At other hardware clocks, the software bits parameter can be copied from incoming messages and passed downstream. Any change in the software bits parameter on incoming messages to hardware clocks can cause an interrupt to be sent to the NIC 204.

Figure 4:
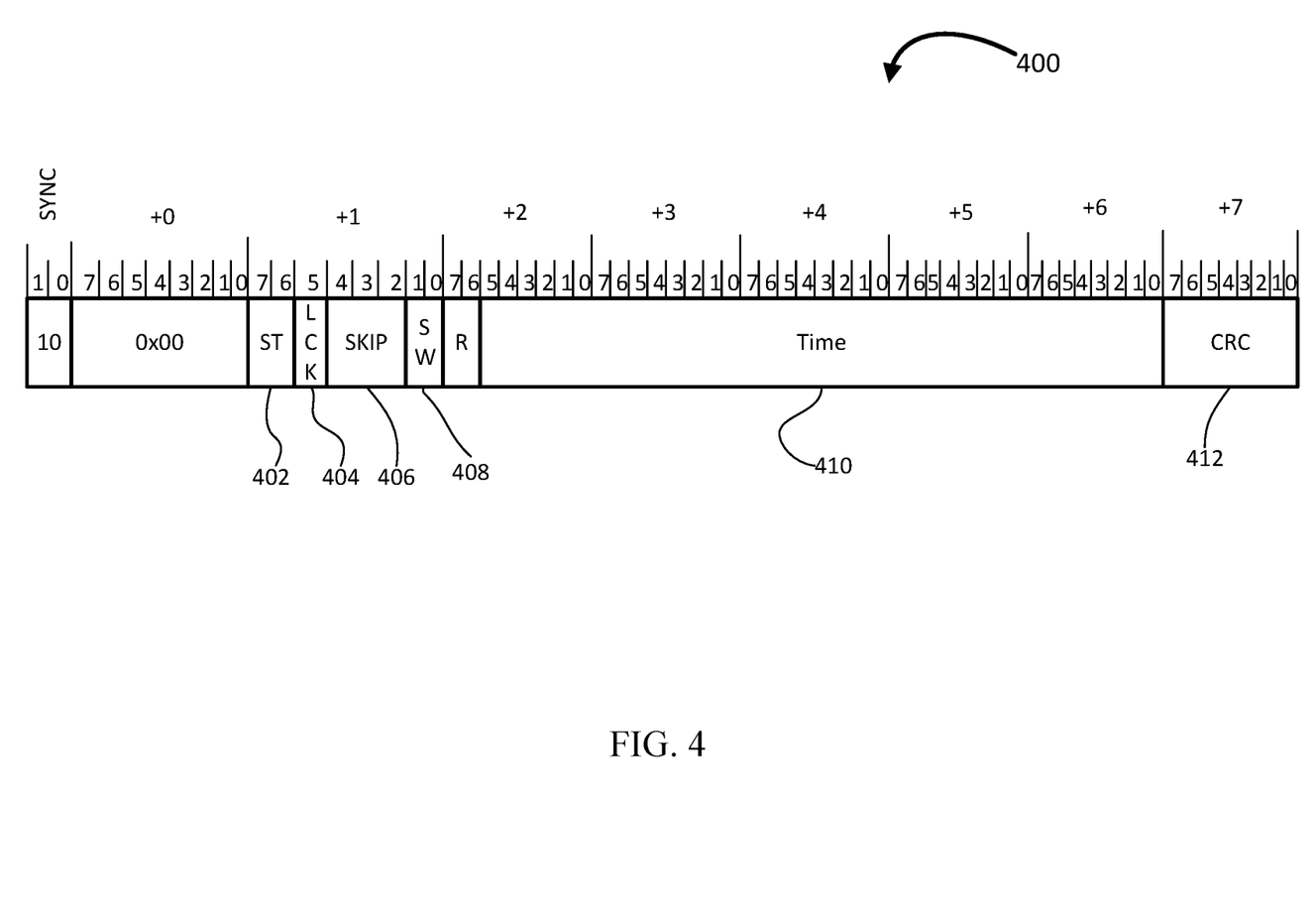
FIG. 4 depicts an example time sync message configured as a time ordered set according to aspects of the disclosure.

Current time is distributed from master hardware clocks to client hardware clocks (and from there to second-hop client hardware clocks, etc.) via time sync messages. FIG. 4 depicts an example time sync message 400 configured as a time ordered set. The message can include a type to indicate the message is a time sync message 400, such as being represented by "10" in FIG. 4. The time sync message 400 can include a number of bits that are always 0 for a time sync message, such as being represented by "0x00" in FIG. 4. The time sync message 400 can also include a subtype 402. The subtype 402 can correspond to the type of time sync message, such as a time update, latency request, or latency response.

The time sync message 400 can further include a time locked parameter 404, a skip update parameter 406, a software bits parameter 408, the time 410, and an error check 412. The time sync message 400 can also include unused bits reserved for future use, such as being represented by "R" in FIG. 4. The error check 412 can be a cyclic redundancy check (CRR) as an example. The time 410 included in the time sync messages 400 can correspond to least significant bits of the time. For example, the time bits can be the least significant 38-bits of the time, which gives a rollover period of about 5 minutes. Since the time sync message 400 can contain the least significant bits of the time, each NIC can compute the time sync by comparing its local time against the incoming time to determine the +0, +1, +2, etc.

Each NIC can be a master, client, or free running Referring back to FIG. 2, the NIC 204 can correspond to a client NIC for a client device. FIG. 2 also depicts a master NIC 212 and other client NICs 214, 216 for a master device 218 and other client devices 220, 222, respectively. While only two other client devices are shown for simplicity, any number of client devices can be included for time synchronization.

A master NIC, such as master NIC 212, can only transmit time sync messages. The master NIC can include software based time synchronization 224 and hardware based time synchronization 226 to synchronize a master hardware clock 228 using time adjust and fine frequency adjustments. Software based time synchronization 224 can include a network time protocol or precision clock synchronization protocols. The hardware based time synchronization 226 can generate the timesync messages to send to downstream client NICs, such as NIC 204.

A client NIC, such as the client NIC 204, 214, or 216, can receive time sync messages from one or more upstream NICs and/or transmit time sync messages to one or more downstream NICs. Upstream NICs can be a master NIC or another client NIC closer in a time distribution tree to the master NIC, such as the client NIC 204. Downstream NICs can be other client NICs further in a time distribution tree from the master NIC, such as the other client NICs 214, 216. Each client NIC can include software based time synchronization for initial setup of a rough time for a hardware clock and hardware based time synchronization for subsequent fine-tuning of the time for the hardware clock. As depicted in FIG. 2, the other client NICs 214, 216 respectively include time synchronization software 230, 232, time synchronization hardware 234, 236, and hardware clocks 238, 240.

A free running NIC (not shown) is independent of master and client NICs. In a free running NIC, the hardware-based time synchronization can be disabled, and only software-based time synchronization can be enabled. A free running NIC can include software-based time synchronization to synchronize the clock using time adjust and fine frequency adjustments. Free running allows the clock to count in units of time, such as ns, instead of cycles, by setting the fine frequency adjustment in the units of time, such as 1.25 ns for an 800 MHz clock.

Each NIC can transmit time sync message on any number of output links via one or more ports in one or more physical layers. For example, master NIC 212 can transmit time sync messages through physical layer 242, the client NIC 204 can transmit time sync messages through physical layers 244, and the other client NICs 214, 216 can respectively transmit time sync messages through the physical layers 246, 248. The time sync messages are transmitted at a configured interval, such as about 1 us, 10, or 100 us. The configured interval can be set by a time update timer register in the time sync hardware. On client hardware clocks, an incoming time sync message can cause an update to be sent downstream even if the time update timer has not expired. This can ensure that even the farthest nodes in the time distribution tree do not drift much from the master clock. The time sync message can indicate the actual time of transmission +/−delays, which can be +/−1 ns, 2.5 ns, 5 ns, or 10 ns as examples. The delays are accounted for by incrementing the time field in the time sync message for each cycle that the time sync message waits to be transmitted, which includes flight time across the network device from the hardware clock and arbitration time to be transmitted.

Each NIC can receive time sync messages via a CSR that can control which port, if any, can accept the time sync messages. While each NIC can receive time sync messages from multiple upstream NICs, each NIC should accept and update its time based on only one upstream NIC. For example, if accepted, the client NIC 204 can receive time sync messages through the physical layer 244 and the other client NICs 214, 216 can respectively receive time sync messages through the physical layers 246, 248. If none of its ports are programmed to accept time sync messages, an NIC can have only software based synchronization enabled, thus corresponding to a free running NIC. A single port in the NIC can be enabled to receive the time sync message to prevent the NIC receiving time sync messages from multiple upstream NICs, which could corrupt time computation. When an enabled port receives the time sync message, the time in the time sync message can be adjusted for any delays to get the time sync message to the hardware clock. Delays can include time to egress the transmitting NIC, time across a link in the network, time to ingress the receiving NIC, and flight time across the network device to the hardware clock.

Each port of an NIC can latch, e.g., extract and save, quality parameters of incoming time sync messages, regardless of whether the port is configured to accept the time sync message on that port. This can enable the NIC to check the quality of the clock received at each port, if any, to assist in deciding which port should be enabled for time sync message reception.

The NICs can include a link latency measurement capability to consider variable length cables, channels, etc. when transmitting and/or receiving time sync messages. Time synchronization software, such as the time sync software 206 in the NIC 204, can send a latency request message to a switch 250. The time sync software 206 can generate a latency request based on a reset of the network device 202 or when a time lock is lost. The switch 250 latches the latency request message and generates a latency response back to the time sync software 206. Just as with time sync messages, the time field of the latency message is incremented every cycle the latency response waits to be transmitted. The time sync software 206 can receive the latency response and subtract the received time field from the current time. The link latency can indicate the roundtrip latency of physical channels, serializer/deserializer (SERDES), on-chip routing, etc., from one hardware clock to another. Because the clocks are hardware based, the link latency measurements can be fixed, allowing for more accurate synchronization than pure software based clocks.

The NICs can be initialized with actual global time. For example, the time sync software 206 can initialize the NIC 204 with the global time as a random value, since synchronization involves relative time. The initial time can be relatively inaccurate, for example +/−10 seconds, in the client NICs so long as thresholds in a time bound register are also large. The time bound register can be included as part of the time sync hardware, such as time sync hardware 208. Once the initial global time is written to all NICs in the network, respective time sync software can enable transmission and reception of time sync messages. Each time bound register in respective NICs can be set for an acceptable threshold so the different NICs can lock on to the master NIC. Once all NICs have been time locked, the time bound register can be made tighter, such as about +/−1-100 ns.

The time between a master and any client should not be off by more than the configured threshold of the time bound register, such as initially +/−10 second but later tightened to +/−1-100 ns. Otherwise, the time sync software in an NIC can reset the time. During reset, the time sync software can unlock the time lock and can ensure time sync messages are not accepted or transmitted.

A time sync message can pass a validity check to be accepted at a received NIC, such as the NIC 204. The validity check can be performed by the time sync hardware, such as time sync hardware 208. The validity check can include determining the time sync message is received at a port enabled for time sync reception, the time sync message has a valid error check, the time sync message indicates a time within a lock threshold cycle of the local time, and/or have an incoming time that is locked.

The hardware clock, such as the hardware clock 210, can internally maintain two CSR readable counts: a skipped updates count and a valid updates count. The skipped updates count can correspond to an amount, such as an integer amount, for determining whether the hardware clock should be reset. The valid updates count can correspond to an amount, such as an integer amount, for determining whether the hardware clock should be time locked. Any time sync message that does not pass the validity check involving time locks can lead to an increment of the skipped update count and a reset of the valid updates count. The skipped update count increment and valid updates count reset can be performed by the time sync hardware, such as time sync hardware 208. When the number of skipped updates increases beyond a time bound skipped messages threshold, such as 7, the master time could have changed, leading to clearing the time lock parameter and interrupting the NIC.

Clearing the time lock parameters and interrupting the NIC can also be performed by the time sync hardware, such as time sync hardware 208.

When a valid update is received, the hardware clock can move towards the received time and the valid updates count is incremented. The skipped update count can be reset to the incoming skipped update value. The valid updates count increment and the skipped updates count reset can be performed by the time sync hardware, such as time sync hardware 208. The incoming skipped updates are copied into the local skipped update to provide information on how much the current client clock could have drifted from the master clock. When the number of valid updates increases beyond a time bound locked messages threshold, such as 7, the hardware clock can lock. Locking can also be performed by the time sync hardware, such as time sync hardware 208. The time lock parameter is updated based on internal skipped updates and valid update counts while the time itself is updated based on validity of incoming time sync messages.

Figure 5:
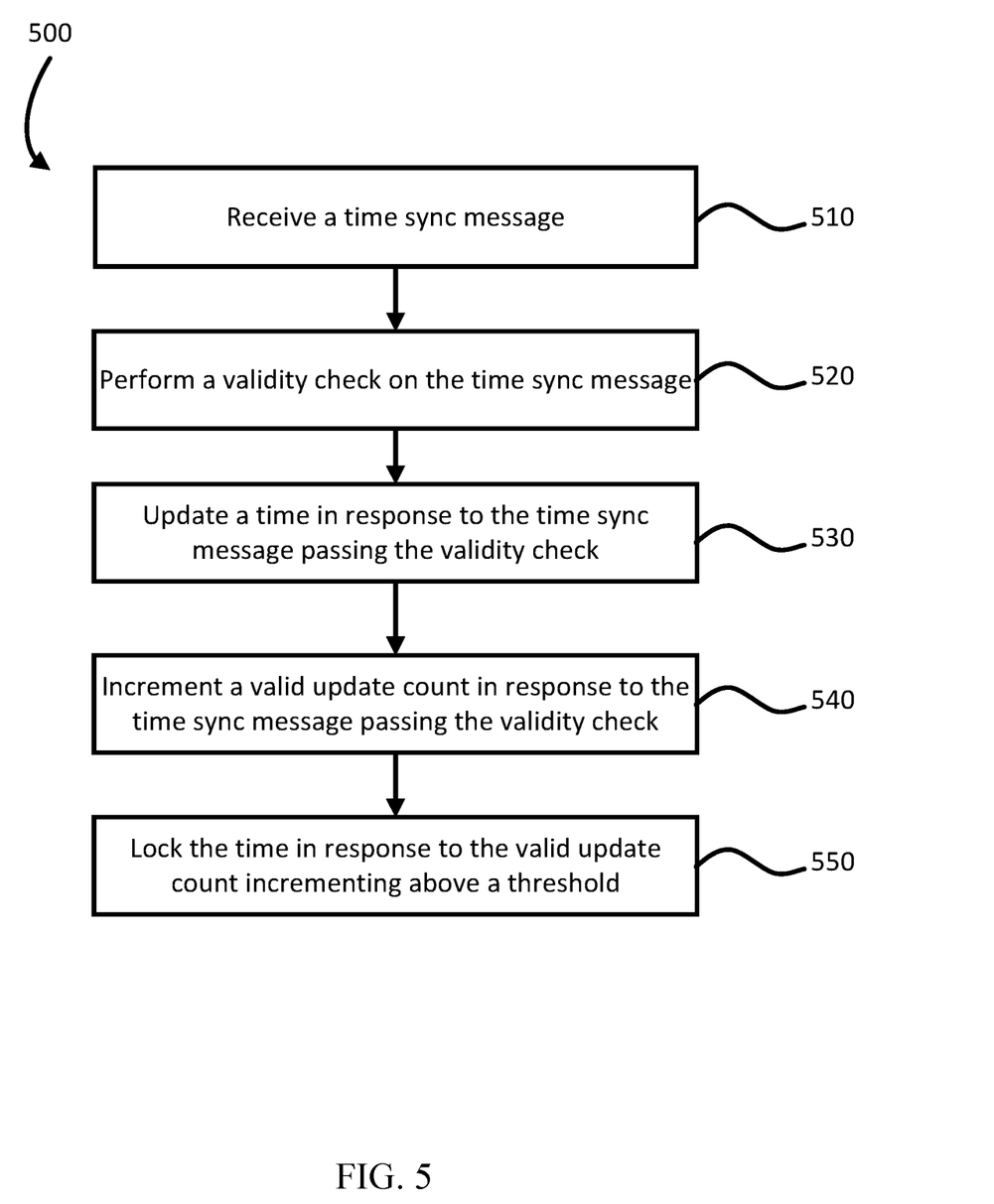
FIG. 5 depicts a flow diagram of an example process for synchronizing time between a master hardware clock and one or more client hardware clocks according to aspects of the disclosure.

FIG. 5 depicts a flow diagram of an example process 500 for synchronizing time between a master hardware clock and one or more client hardware clocks. The example process 500 can be performed on a system of one or more processors in one or more locations, such as the time synchronizer 164 of network interface card 160 as depicted in FIG. 1.

As shown in block 510, the time synchronizer 164 for a client hardware clock can receive a time sync message. The time sync message can be transmitted from time synchronizers for a master hardware clock or an upstream client hardware clock.

As shown in block 520, the time synchronizer 164 can perform a validity check on the time sync message. For the validity check, the time synchronizer can determine the time sync message is received at a port of the network interface card 160 enabled for time sync message reception, the time sync message has a valid error check, the time sync message indicates a time within a lock threshold cycle of the client hardware clock, and/or have an incoming time that is locked.

As shown in block 530, in response to the received time sync message passing the validity check, the time synchronizer 164 can update a time of the client hardware clock. Updating the time can include running the client hardware clock slower or faster for as many cycles as needed based on a step size. Updating the time can further include adjusting a frequency of the client hardware clock.

As shown in block 540, in response to the received time sync message passing the validity check, the time synchronizer 164 can increment a valid update count. The time synchronizer 164 can also reset a skipped update count to an incoming skipped update value. The valid update counts and the skipped update counts can be maintained in the client hardware clock.

As shown in block 550, in response to the valid update count incrementing above a threshold, the time synchronizer 164 can lock the time of the client hardware clock. Locking the client hardware clock can indicate the client hardware clock is within a desired threshold range from the master hardware clock.

Figure 6:
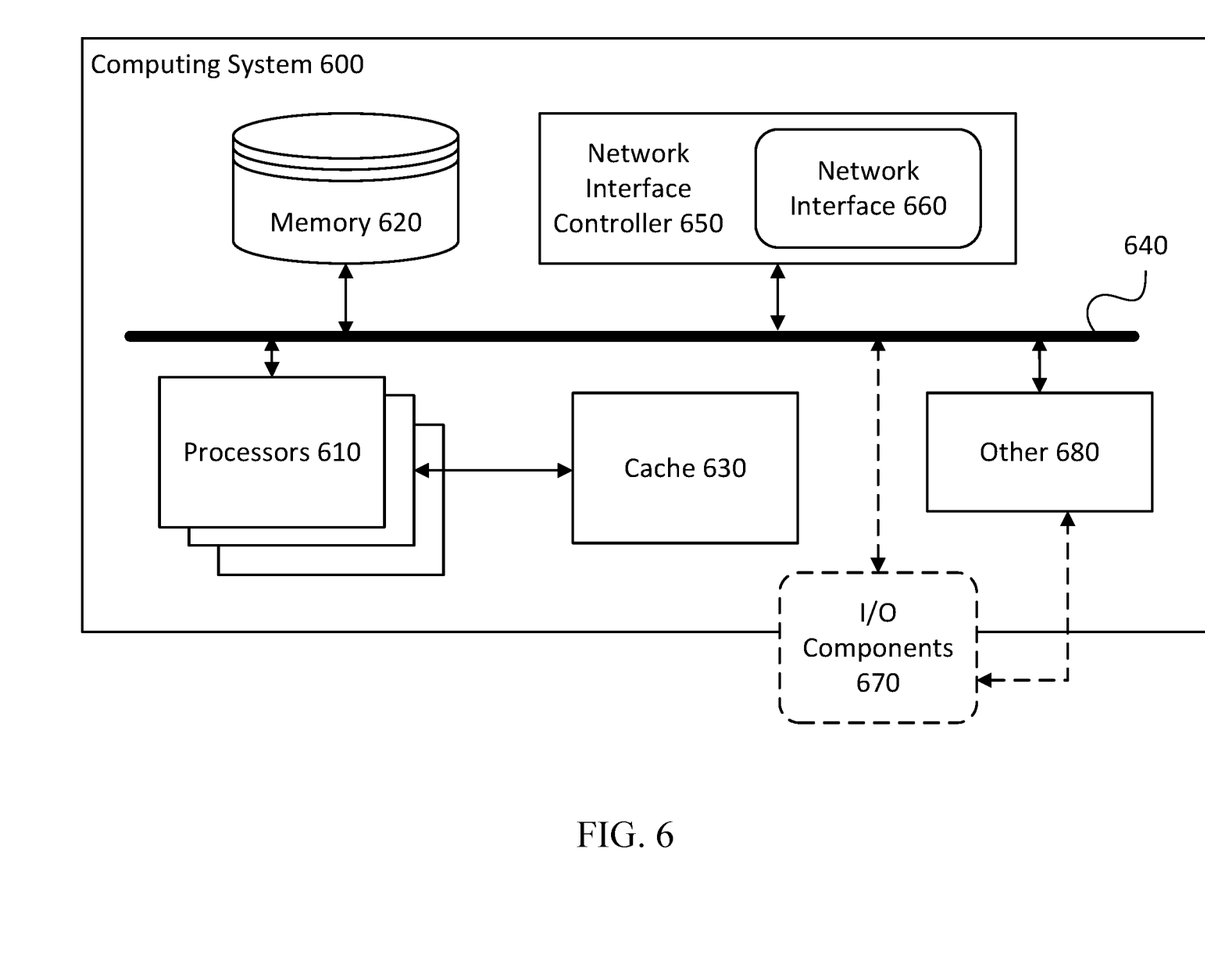
FIG. 6 depicts an example computing system according to aspects of the disclosure.

FIG. 6 depicts an example computing system 600, which can be configured as the network device 110 of FIG. 1. The computing system 600 can include one or more processors 610 in communication with memory 620, at least one network interface controller 650 with network interface port 660 for connection to a network, input/output (I/O) components 670, and other components 680. The processors 610 can be in communication with the memory 620, network interface controller 650, I/O components 670, and other components 680 via a bus 640, as an example. The processors 610 can incorporate, or are connected to, cache memory 630. In some instances, instructions are read from memory 620 into cache memory 630 and executed by the processors 610 from cache memory 630.

The processors 610 can be any logic circuitry that executes instructions fetched from the memory 620 or cache 630. The processors 610 can be microprocessor units or special purpose processors. The computing device 600 can be based on any processor, or set of processors, capable of operating as described herein. The processors 610 can be single core or multi-core processors. The processors 610 can be multiple distinct processors. The processors 610 can be implemented as circuitry on one or more chips.

The memory 620 can be any device suitable for storing computer readable data. The memory 620 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The computing system 600 can have any number of memory devices 620.

The cache memory 630 can be a form of computer memory placed in close proximity to the processors 610 for fast access times. The cache memory 630 can be part of, or on the same chip as, the processors 610. There can be multiple levels of cache 630, e.g., level 2 and level 3 cache layers.

The network interface controller 650 can manage data exchanges via the network interface 660. The network interface controller 650 can handle the physical and data link layers of the open systems interconnection (OSI) model for network communication. Some of the tasks of the network interface controller 650 can be handled by one or more of the processors 610. The network interface controller 650 can be incorporated into the processors 610, such as circuitry on the same chip.

The computing system 600 can have multiple network interfaces 660 controlled by a single controller 650 or multiple network interface controllers 650. Each network interface 660 can be a connection point for a physical network link, e.g., a cat-5 Ethernet link. The network interface controller 650 can support wireless network connections and an interface port 660 can be a wireless, e.g., radio, receiver/transmitter. The network interface controller 650 can implement one or more network protocols such as Ethernet. The computing system 600 can exchange data with other computing systems via physical or wireless links through a network interface 660. The network interface 660 can link directly to another device or to another device via an intermediary device, e.g., a network device such as a hub, a bridge, a switch, or a router, connecting the computing device 600 to a data network such as the Internet.

The computing system 600 can include, or provide interfaces for, one or more input or output (I/O) components 670. Input devices can include keyboards, microphones, touch screens, sensors, and pointing devices, such as a mouse or trackball, as examples. Output devices can include video displays, speakers, and printers, as examples.

Other components 680 can include an I/O interface, external serial device ports, and any additional co-processors. For example, the computing system 600 may include an interface, e.g., a universal serial bus (USB) interface, for connecting input devices, output devices, or additional memory devices, e.g., portable flash drive or external media drive. The computing device 600 can include an additional co-processor, such as a math co-processor to assist the processors 610 with high precision or complex calculations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for synchronizing time between a master hardware clock and one or more client hardware clocks, the method comprising:
   receiving, by one or more processors of a client hardware clock, a time sync message;
   performing, by the one or more processors, a validity check on the time sync message;
   updating, by the one or more processors, a time of the client hardware clock in response to the received time sync message passing the validity check;
   incrementing, by the one or more processors, a valid update count in response to the received time sync message passing the validity check; and
   locking, by the one or more processors, the time of the client hardware clock to be within a threshold range from the master hardware clock in response to the valid update count incrementing above a threshold.

2. The method of claim 1, wherein the time sync message is transmitted from one or more processors of one of a master hardware clock or an upstream client hardware clock.

3. The method of claim 1, further comprising transmitting, with the one or more processors, the time sync message to a downstream client hardware clock.

4. The method of claim 1, wherein updating the time of the client hardware clock further comprises at least one of:
   adjusting the time a number of steps forward or backward; or
   adjusting a frequency of the client hardware clock.

5. The method of claim 1, wherein locking the client hardware clock further comprises determining the client hardware clock is within the threshold range from the master hardware clock.

6. The method of claim 1, further comprising:
   transmitting, by the one or more processors, a latency request message;
   receiving, by the one or more processors, a latency response message; and
   determining, by the one or more processors, a hardware latency time based on a time difference from when the latency request message was transmitted to the latency response message being received.

7. The method of claim 6, wherein updating the time of the client hardware clock further comprises removing hardware latency time from the time of the client hardware clock.

8. The method of claim 6, wherein the hardware latency time is fixed.

9. The method of claim 1, wherein performing the validity check comprises at least one of determining the time sync message is received at a port enabled for time sync message reception, determining the time sync message has a valid error check, determining the time sync message indicated a time within a threshold, or determining the time sync message has a time that is locked.

10. The method of claim 1, further comprising skipping, by the one or more processors, an update of the time of client hardware clock in response to the received time sync message not passing the validity check.

11. The method of claim 10, further comprising incrementing, by the one or more processors, a skip update count in response to the received time sync message not passing the validity check.

12. The method of claim 11, further comprising resetting, by the one or more processors, the client hardware clock in response to the skip update count incrementing above a threshold.

13. A system comprising:
   one or more processors; and
   one or more storage devices coupled to the one or more processors and storing instructions that, when executed by the one or more processors, cause the one or more processors to perform operations for synchronizing time between a master hardware clock and one or more client hardware clocks, the operations comprising:
   receiving a time sync message;
   performing a validity check on the time sync message;
   updating a time of a client hardware clock in response to the received time sync message passing the validity check;
   incrementing a valid update count in response to the received time sync message passing the validity check; and
   locking the time of the client hardware clock to be within a threshold range from the master hardware clock in response to the valid update count incrementing above a threshold.

14. The system of claim 13, wherein updating the time of the client hardware clock further comprises at least one of:
   adjusting the time a number of steps forward or backward; or
   adjusting a frequency of the client hardware clock.

15. The system of claim 13, wherein locking the client hardware clock further comprises determining the client hardware clock is within the threshold range from the master hardware clock.

16. The system of claim 13, wherein the operations further comprise:
   transmitting a latency request message;
   receiving a latency response message; and
   determining a hardware latency time based on a time difference from when the latency request message was transmitted to the latency response message being received;
   wherein updating the time of the client hardware clock further comprises removing the hardware latency time from the time of the client hardware clock.

17. The system of claim 13, wherein the operations further comprise:
   skipping an update of the time of client hardware clock in response to the received time sync message not passing the validity check;

incrementing a skip update count in response to the received time sync message not passing the validity check; and resetting the client hardware clock in response to the skip update count incrementing above a threshold.

18. A non-transitory computer readable medium for storing instructions that, when executed by one or more processors, cause the one or more processors to perform operations for synchronizing time between a master hardware clock and one or more client hardware clocks, the operations comprising:

receiving a time sync message;

performing a validity check on the time sync message;

updating a time of a client hardware clock in response to the received time sync message passing the validity check;

incrementing a valid update count in response to the received time sync message passing the validity check; and locking the time of the client hardware clock to be within a threshold range from the master hardware clock in response to the valid update count incrementing above a threshold.

19. The non-transitory computer readable medium of claim 18, wherein the operations further comprise:

transmitting a latency request message;

receiving a latency response message; and determining a hardware latency time based on a time difference from when the latency request message was transmitted to the latency response message being received;

wherein updating the time of the client hardware clock further comprises removing the hardware latency time from the time of the client hardware clock.

20. The non-transitory computer readable medium of claim 18, wherein the operations further comprise:

skipping an update of the time of client hardware clock in response to the received time sync message not passing the validity check;

incrementing a skip update count in response to the received time sync message not passing the validity check; and resetting the client hardware clock in response to the skip update count incrementing above a threshold.

* * * * *